US007940020B2

(12) United States Patent
Brown

(10) Patent No.: US 7,940,020 B2
(45) Date of Patent: May 10, 2011

(54) BRUSHLESS DC MOTOR WITH REDUCED CURRENT RIPPLE

(75) Inventor: Robert G. Brown, New Hartford, CT (US)

(73) Assignee: The Bergquist Torrington Company, Chanhassen, MN (US)

( * ) Notice: Subject to any disclaimer, the term of this patent is extended or adjusted under 35 U.S.C. 154(b) by 729 days.

(21) Appl. No.: 11/941,426

(22) Filed: Nov. 16, 2007

(65) Prior Publication Data

US 2009/0128070 A1 May 21, 2009

(51) Int. Cl.
H03K 5/00 (2006.01)

(52) U.S. Cl. ......... 318/400.13; 318/400.01; 318/400.04; 318/400.17; 318/400.26; 318/400.27; 318/400.28; 318/400.35

(58) Field of Classification Search ............. 318/400.01, 318/400.04, 400.13, 400.17, 400.26, 400.27, 318/400.28, 400.35
See application file for complete search history.

(56) References Cited

U.S. PATENT DOCUMENTS

| | | | |
|---|---|---|---|
| 4,356,437 A | 10/1982 | Saito et al. | |
| 5,044,897 A | 9/1991 | Dorman | |
| 5,079,467 A | 1/1992 | Dorman | |
| 5,144,209 A | 9/1992 | Ingji et al. | |
| 5,319,290 A | 6/1994 | Yoshino et al. | |
| 5,444,341 A | 8/1995 | Kneifel, II et al. | |
| 5,625,264 A | 4/1997 | Yoon | |
| 5,869,946 A | 2/1999 | Carobolante | |
| 5,923,141 A | 7/1999 | McHugh | |
| 5,990,643 A * | 11/1999 | Holling et al. | 318/400.34 |
| 6,121,736 A | 9/2000 | Narazaki et al. | |
| 6,124,689 A | 9/2000 | Kardash | |
| 6,316,894 B2 * | 11/2001 | Hashimura | 318/400.04 |
| 6,369,535 B1 | 4/2002 | Wang et al. | |
| 6,650,084 B2 | 11/2003 | Fujioka et al. | |
| 6,661,192 B2 * | 12/2003 | Copeland | 318/400.35 |
| 6,806,663 B2 * | 10/2004 | Kusaka et al. | 318/400.17 |
| 6,975,082 B2 | 12/2005 | Crain et al. | |
| 7,026,772 B2 | 4/2006 | Quirion | |
| 7,141,949 B2 | 11/2006 | Harwood | |
| 7,592,761 B2 * | 9/2009 | MacKay | 318/254.1 |
| 7,692,395 B2 * | 4/2010 | Brown | 318/400.13 |

(Continued)

OTHER PUBLICATIONS

"Sensorless BLDC Control with Back EMF Filtering", Reston Condit, Microchip AN1083, Microchip Technology, Inc. 2007, pp. 1-14.

*Primary Examiner* — Walter Benson
*Assistant Examiner* — Kawing Chan
(74) *Attorney, Agent, or Firm* — Haugen Law Firm PLLP; Frederick Niebuhr

(57) ABSTRACT

A commutation circuit for driving a brushless DC motor is controlled according to a commutation cycle composed of alternating primary steps and transitional steps. The commutation circuit includes pairs of field effect transistors coupled in series between the high voltage and low voltage terminals of a DC power supply. Output terminals between each pair of transistors are individually coupled to the phases of a DC motor. A controller operates the commutation circuit to selectively set the phases at active and inactive states. The controller further employs a plurality of voltage control functions individually associated with the motor phases to selectively modulate the voltage applied to one of the phases during the active states, to provide transitional steps in the commutation cycle during which the applied voltage is modulated to reduce its magnitude with respect to the high voltage or the low voltage.

27 Claims, 10 Drawing Sheets

U.S. PATENT DOCUMENTS

| | | | |
|---|---|---|---|
| 2004/0217665 A1* | 11/2004 | Hans | 310/156.47 |
| 2005/0110442 A1 | 5/2005 | Trifilo | |
| 2005/0212472 A1* | 9/2005 | Chapman et al. | 318/439 |
| 2005/0225272 A1* | 10/2005 | Wu et al. | 318/254 |
| 2007/0013330 A1 | 1/2007 | Noh | |
| 2007/0046234 A1* | 3/2007 | Crabill et al. | 318/439 |
| 2010/0007297 A1* | 1/2010 | Brown et al. | 318/400.32 |

* cited by examiner

Fig.-11

|    | 0 | 0/1 | 1 | 1/2 | 2 | 2/3 | 3 | 3/4 | 4 | 4/5 | 5 | 5/0 |
|----|---|-----|---|-----|---|-----|---|-----|---|-----|---|-----|
| AH | 0 | 0   | 0 | 0   | 0 | 1   | 1 | 1   | 1 | X   | 0 | 0   |
| BH | 1 | X   | 0 | 0   | 0 | 0   | 0 | 0   | 0 | 1   | 1 | 1   |
| CH | 0 | 1   | 1 | 1   | 1 | X   | 0 | 0   | 0 | 0   | 0 | 0   |
| AL | 1 | 1   | 1 | X   | 0 | 0   | 0 | 0   | 0 | 0   | 0 | 1   |
| BL | 0 | 0   | 0 | 1   | 1 | 1   | 1 | X   | 0 | 0   | 0 | 0   |
| CL | 0 | 0   | 0 | 0   | 0 | 0   | 0 | 1   | 1 | 1   | 1 | X   |

US 7,940,020 B2

BRUSHLESS DC MOTOR WITH REDUCED CURRENT RIPPLE

BACKGROUND OF THE INVENTION

The present invention relates to electrically commutated motors, and more particularly to controllers and drivers for trapezoidally commutated motors.

Brushless electronically commutated motors have been utilized increasingly in lieu of brushed DC motors in numerous applications, primarily for their advantages of lower cost, higher efficiency, and longer useful life. Electronically commutated motors and drivers generally are provided in two types: sinusoidally commutated motors and trapezoidally commutated motors.

Sinusoidally commutated motors, also known as permanent magnet AC synchronous motors, have a back EMF (electromotive force) waveform similar to a sine wave. In a three-phase motor, all phases are driven simultaneously at different voltages that vary substantially sinusoidally. Separate position sensors, e.g. Hall effect sensors, are required to provide the necessary rotor position information to the electronic drive.

Trapezoidally commutated motors, also known as brushless DC motors, have a somewhat trapezoidally-shaped back EMF waveform. In a three-phase motor, the phases are driven intermittently and in pairs so that at any given time one of the phases is not driven. This allows use of the back EMF signal, in particular its zero crossing, to be used to determine rotor position, a configuration referred to as a sensorless drive.

The motor is driven through selective application of voltages to the different phases in a repeating sequence, i.e. a commutation cycle. FIG. 1 illustrates the six steps of a commutation cycle in a standard brushless DC motor. During each step, two of the phases are in an active state, i.e. either driven at a high voltage or driven at a low voltage, while the third phase is not driven. Between each pair of succeeding steps, two of the phases transition, either from an active state to the inactive state or from the inactive state to one of the active states.

FIG. 2 graphically illustrates the commutation cycle, with motor phases A, B, and C aligned to facilitate recognizing simultaneous transitions. It is to be appreciated that the levels "1," "−1," and "0" respectively represent a high voltage, a low voltage (which may be ground), and a center voltage midway between the high and low voltages; in other words, the sum of the high and low voltages divided by two.

FIG. 3 graphically represents the current levels in phases A, B, and C corresponding to the applied voltages indicated in FIG. 2. While each change in voltage between an active state and the inactive state entails a rapid change in current through the particular phase, it further is apparent that a given phase kept constant from one step to the next also experiences a change in current, due to the steep changes in the other phases.

The resultant or sum of the currents in phases A-C is shown in FIG. 4. The repeating fluctuations, known as commutation current ripple, result in a corresponding commutation torque ripple that is undesirable because it increases motor noise and reduces motor efficiency. While this is a tolerable result in many applications, more demanding environments require the more complex and more costly sinusoidal commutation.

Therefore, the present invention has several aspects directed to one or more of the following objects:

to provide a commutation circuit operable to apply different voltages individually to different phases in a manner to reduce commutation torque ripple in a trapezoidally commutated DC motor;

to provide a process for controlling a motor driver to add transitional steps in the commutation cycle to achieve smoother operation;

to provide a controller operable in conjunction with commutation circuitry to apply a more constant resultant or total current through multiple phase windings; and to provide a more reliable, less costly and longer lasting trapezoidally commutated motor.

SUMMARY OF THE INVENTION

To achieve these objects, there is provided a system for controlling a brushless DC motor. The system includes a commutation circuit adapted for coupling between a DC power supply and a brushless DC motor. The circuit has first and second input terminals adapted for coupling respectively to a high voltage terminal and a low voltage terminal of a DC power supply. The commutation circuit further has a plurality of output terminals adapted for coupling individually to a plurality of stator windings corresponding to different motor phases. The commutation circuit further includes a plurality of switching elements coupled between the input terminals and the output terminals, operable with respect to each output terminal to apply one of several alternative states including: (i) a first active state for biasing the output terminal to the high voltage to drive an associated stator winding at the high voltage; (ii) a second active state for biasing the output terminal at the low voltage to drive the associated stator winding at the low voltage; and (iii) an inactive state in which the associated stator winding is not driven. A plurality of voltage control functions are individually associated with different ones of the output terminals. Each control function is adapted to bias its associated output terminal at an alternate voltage between the high voltage and the low voltage. A controller is operatively coupled to the commutation circuit and adapted to apply the alternative states selectively to the output terminals to generate a commutation cycle comprised of a sequence of primary steps. The controller further is operatively coupled to the voltage control functions to selectively actuate the voltage control functions during transitional steps of the commutation cycle between pairs of adjacent primary steps. The controller is specifically operable with respect to a selected one of the output terminals undergoing a change in state between a given primary step and a given succeeding primary step to bias the selected output terminal to the alternate voltage during a given transitional step between the given primary steps.

Preferably the controller uses current rotor position information to facilitate synchronizing the commutation cycle with rotor speed and angular position. To this end, the DC motor can be equipped with Hall effect sensors or similar components. More preferably, however, the commutation cycle places at least one of the phase windings in the inactive state during each step of the commutation cycle. The back EMF signal from the inactive phase provides the current rotor position information.

The preferred commutation cycle further involves at least one transitioning phase, i.e. a phase that undergoes change between the inactive state and one of the active states from each primary step in the commutation cycle to the next. In such cases, the controller actuates the control function associated with that phase to apply the alternate voltage.

The preferred switching elements are field effect transistors (FET's), which facilitate digital control of the commutation circuit. In particular, the controller provides multiple digital outputs individually associated with the gate terminals of the FET's. The voltage control functions advantageously comprise pulse width modulating components. The controller can comprise a digital processor with a storage area for storing current position information, a clock operably associated with the storage area for generating a motor velocity, a commutation algorithm for governing the switching elements and the voltage control functions according to the commutation cycle, and a timing function operatively associated with the clock and the algorithm for projecting temporal starting points of the primary steps and transitional steps.

Another aspect of the invention is a process for commutating an electric motor through a commutation circuit including switching elements coupled between a high voltage and a low voltage in pairs associated individually with different stator windings corresponding with different motor phases. The process includes:

a. selectively operating the switching elements at discrete times synchronized with motor rotational speed to generate at each of the stator windings a commutation cycle composed of a series of primary steps, by alternatively applying one of several distinct states to each of the windings, wherein the alternative states include: (i) a first active state for biasing the output terminal to the high voltage to drive an associated stator winding at the high voltage; (ii) a second active state for biasing the output terminal at the low voltage to drive the associated stator winding at the low voltage; and (iii) an inactive state in which the associated stator winding is not driven;

b. operatively associating one of a plurality of voltage control functions with each of the stator windings;

c. selectively operating different ones of the voltage control functions at discrete times synchronized with motor rotational speed to generate transitional steps between adjacent primary steps, whereby during each transition step, a voltage control function associated with a selected one of the stator windings transitioning between the inactive state and a selected one of the active states is actuated to bias the selected stator winding at an alternate voltage lower than the high voltage and higher than the low voltage.

Preferably, the switching elements are operated to generate a commutation cycle such that from a given primary step to its given succeeding primary step at least a selected one of the stator windings transitions between the inactive state and one of the active states. Then, the voltage control functions are operated such that the particular voltage control function associated with the selected stator winding is actuated during the transition step between the given primary steps. In a three phase motor, typically there are two phases that transition between each pair of adjacent primary steps. In such cases it has been found satisfactory to actuate the voltage control function associated with only a selected one of the transitioning phases, although both transitioning phases could be subject to the alternate voltage if desired.

Further in connection with three phase motors, the preferred commutation cycle consists of six primary steps alternating with six transitional steps over 360 degrees of electrical rotation. Depending on the motor design, each mechanical rotation of the rotor may be equivalent to one electrical rotation or an integral number of electrical rotations. In either event, each pair including a primary step and its adjacent transitional step has an angular dimension of sixty degrees. The transitional steps have an angular dimension of at most twenty degrees, and more preferably have an angular dimension of about ten degrees. The smaller transitional steps provide sufficient current smoothing while ensuring that each phase of the motor remains inactive for a sufficient time to enable use of the back EMF signal to determine rotor position.

In accordance with the present invention, a trapezoidally commutated motor can be operated to undergo smoother transitions and with the more uniform summed or resultant current associated with sinusoidally driven motors. This enhances motor efficiency and life, and allows for the use of trapezoidally driven motors in applications that traditionally would require sinusoidal drives.

IN THE DRAWINGS

For a further understanding of the foregoing features and advantages, reference is made to the following detailed description and to the drawings, in which:

FIG. 1 is a flow chart depicting a commutation cycle for a three phase DC motor;

FIGS. 2A-C graphically depict voltages applied to the different phases;

FIG. 3 graphically depicts the current generated in phases A-C as a result of the applied voltages;

FIG. 4 graphically depicts the resultant or total current representing the sum of currents in phases A, B, and C.

FIG. 5 schematically illustrates a brushless DC motor, driver, and controller configured in accordance with the present invention;

Figure 10:
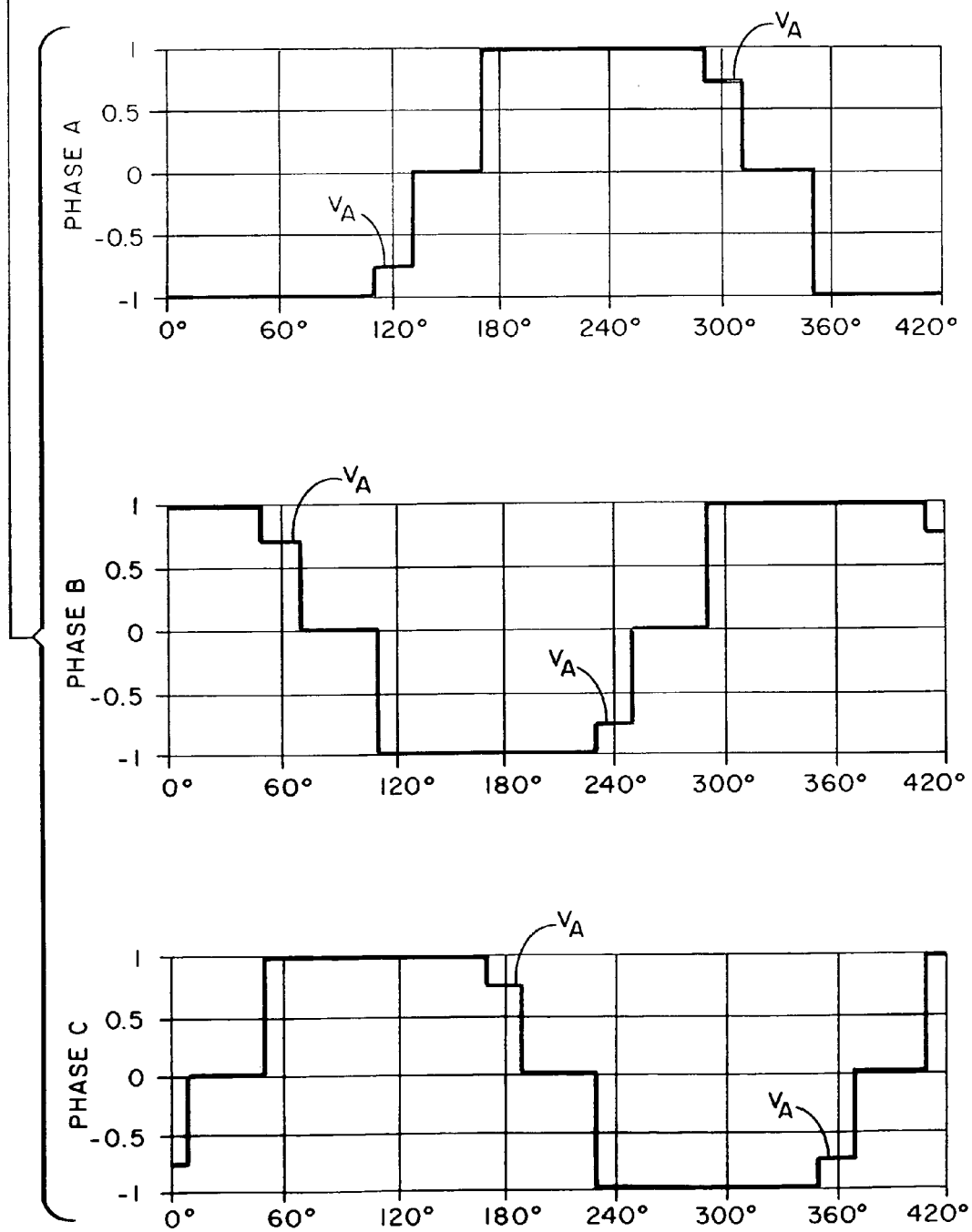
Figure 12A:
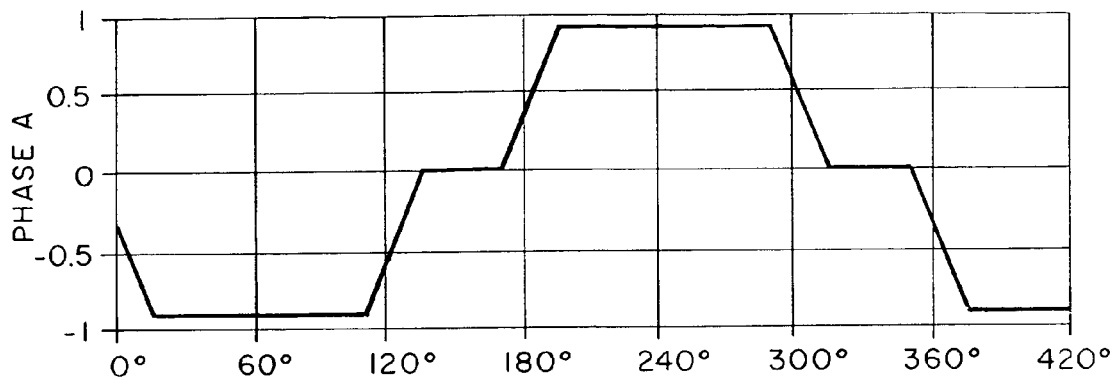
Figure 12B:
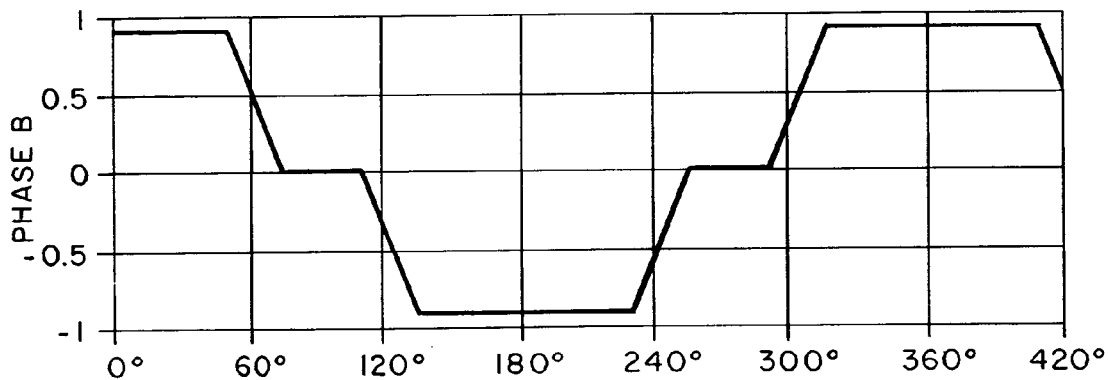
Figure 12C:
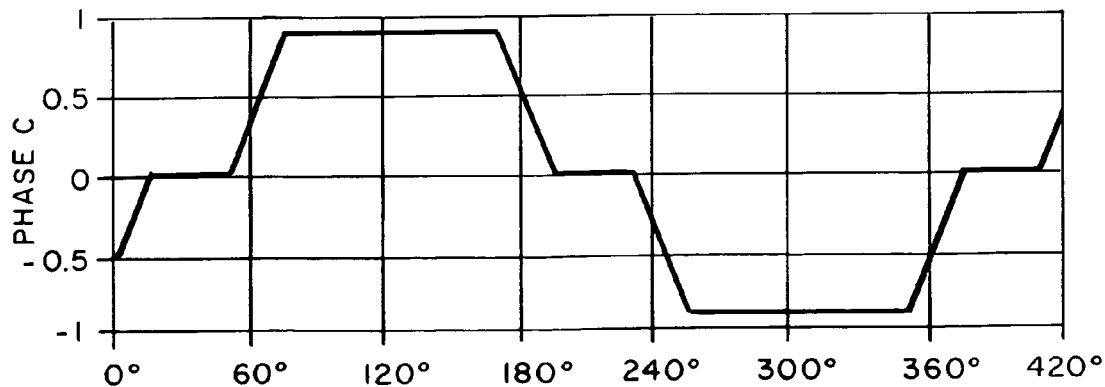
Figure 13:
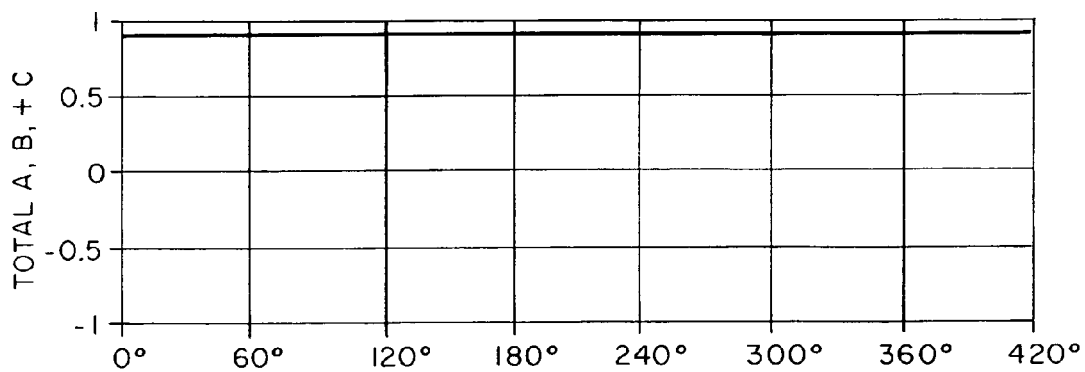

FIG. 10 graphically represents the modified commutation cycle;

FIG. 11 is a diagrammatic view of a commutation algorithm employed to digitally control the switching elements and voltage control functions in accordance with the invention;

FIG. 12 graphically depicts currents in motor phases A-C corresponding to the voltages depicted in FIG. 10;

FIG. 13 depicts a sum of the currents in phases A-C; and

Figure 14:
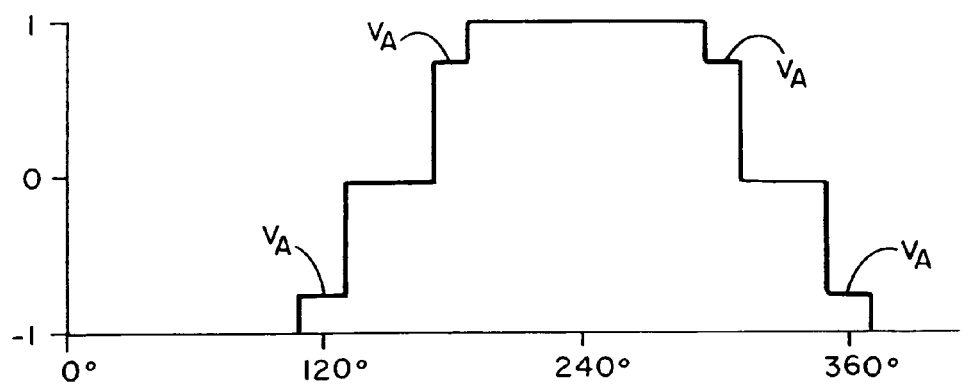
Figure 15:
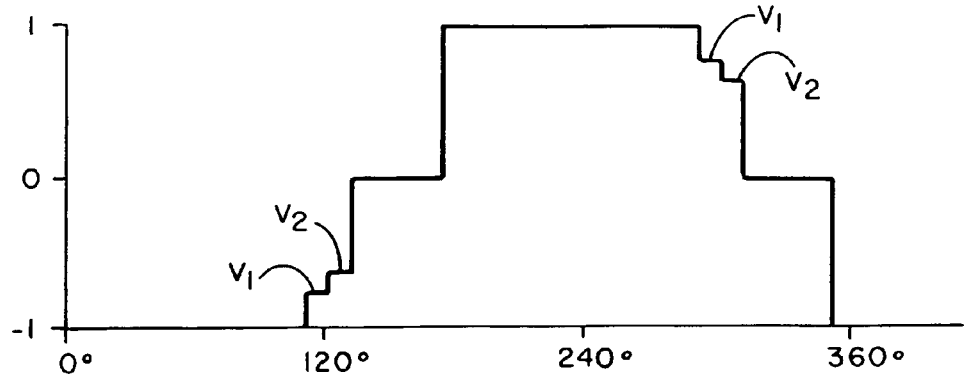

FIG. 14 and 15 are graphical depictions of alternative controller configurations for operating commutation circuitry.

DETAILED DESCRIPTION OF THE PREFERRED EMBODIMENTS

Figure 5:
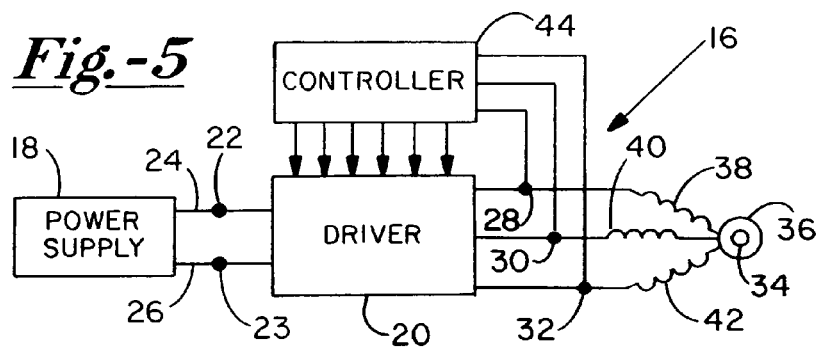

With further reference to the drawings, FIG. 5 shows a system 16 for coupling a 3-phase brushless DC motor to a DC power supply 18. System 16 includes a commutation circuit or driver 20 having input terminals 22 and 23 coupled respectively to a high voltage line 24 and low voltage line 26 of the power supply. Driver 20 has several output terminals 28, 30 and 32 coupled to the motor. The motor includes a rotor 34 surrounded by a stator 36 and supported for rotation relative to the stator through selective driving of stator windings 38, 40 and 42 which represent angularly separated phases A, B, and C of the motor. Driver output terminals 28, 30 and 32 are coupled respectively to stator windings 38, 40 and 42.

System 16 further includes a controller 44, preferably a microprocessor, for controlling driver 20 to selectively and alternatively apply the high voltage and the low voltage individually to stator windings 38, 40 and 42. Controller 44 further is coupled to output terminals 28, 30 and 32 to receive back EMF voltages from the stator windings, in each case during a step in the commutation cycle when the winding is not driven, i.e. when neither the high voltage nor the low voltage is applied to that stator winding. During each such step or time, controller 44 senses the zero crossing of the back EMF signal to determine the rotor angular position relative to the stator. The rotor position information is used by the controller to synchronize the commutation cycle with the rotor position.

Figure 6:
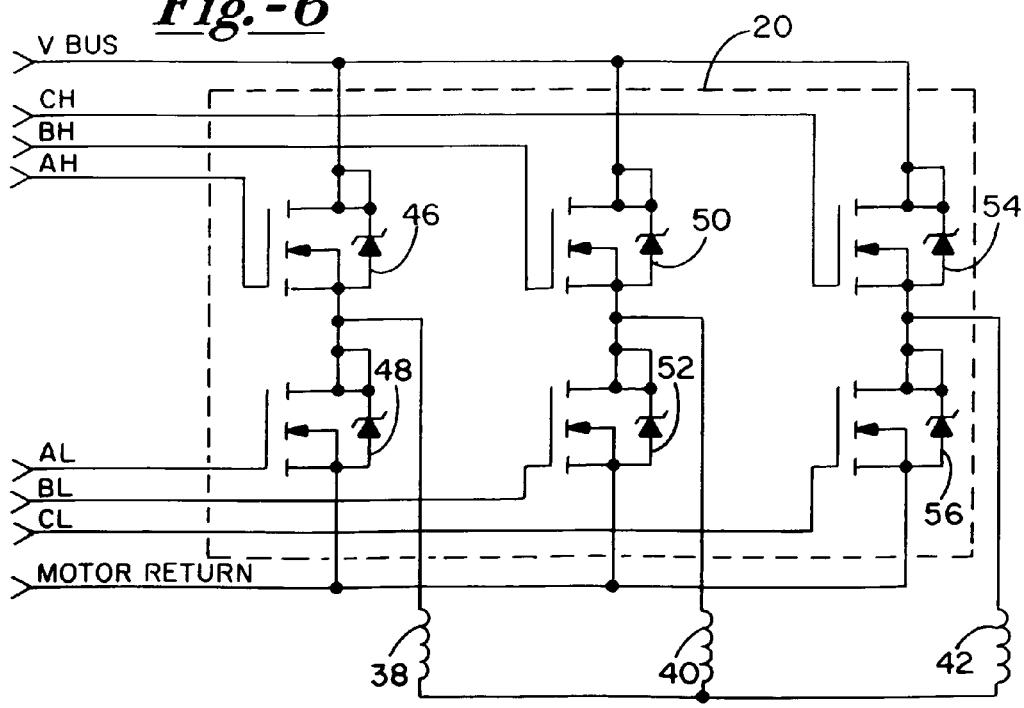
FIG. 6 is a schematic view of the driver.

As shown schematically in FIG. 6, driver 20 includes a series of switching elements in the form of field-effect transistors (FET's) coupled between high voltage line 24 (labeled "VBUS") and low voltage line 26 (labeled as "MOTOR RETURN"). A pair of switching elements 46 and 48 are coupled in series between lines 24 and 26, with terminal 28 coupled between the switching elements to associate the pair with stator winding 38. In similar fashion, a pair of switching elements 50 and 52 are serially coupled and associated with stator winding 40, and a serially coupled pair of switching elements 54 and 56 are associated with stator winding 42. The inputs labeled AH, BH and CH are control signals provided to the respective gate terminals of switching elements 46, 50 and 54 coupled between high voltage line 24 and the driver output terminals. Inputs AL, BL, and CL are the control inputs coupled to the gate terminals of switching elements 48, 52 and 56 between the respective driver output terminals and low voltage line 26.

Figure 7:
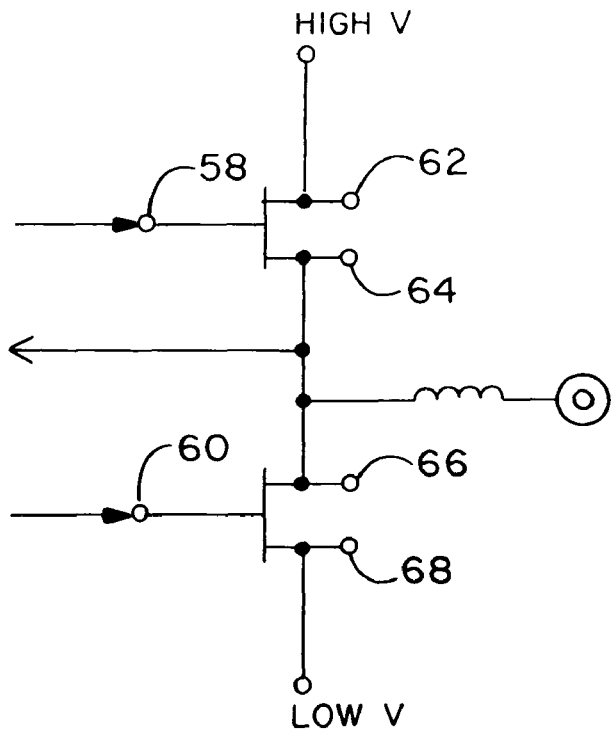
FIG. 7 illustrates a pair of switching elements in the driver associated with one of the motor phases.

As shown in FIG. 7 with respect to motor phase B, signals BH and BL are provided to gate terminals 58 and 60 of switching elements 50 and 52 respectively. A source terminal 62 of FET 50 is coupled to high voltage line 24, while a drain terminal 64 of the FET is coupled to output terminal 30. A source terminal 66 and a drain terminal 68 of FET 52 are coupled to terminal 30 and low voltage line 26 respectively. Output terminal 30 is coupled to stator winding 40 as previously noted, and further provides an input "B" to controller 44.

Each FET is controllably switched by the input to its gate terminal. A logic level "1" to gate 58 switches FET 50 "on" to provide the high voltage at terminal 30, assuming FET 52 is in the "off" condition. Likewise, a "1" input BL to gate 60 switches FET 52 to the "on" state to drive the voltage of terminal 30 to the low voltage, again assuming FET 50 is "off." When both inputs BH and BL are at the low or "0" level, switching elements 50 and 52 are both "off" to set stator winding 40 in an inactive state in which the winding is not driven. Switching elements 50 and 52 function as high impedance resistors, tending to set the voltage at terminal 30 to a center voltage midway between the high voltage and the low voltage.

Switching elements 46, 48, 52 and 56 are similarly governed by the inputs to their gate terminals. Each pair of switching elements is operable to maintain the associated driver output terminal in one of three states: a first active state at the high voltage for driving the corresponding stator winding at the high voltage; a second active state at the low voltage for driving the corresponding stator winding at the low voltage; and an inactive state in which the corresponding stator winding is not driven.

Figure 8:
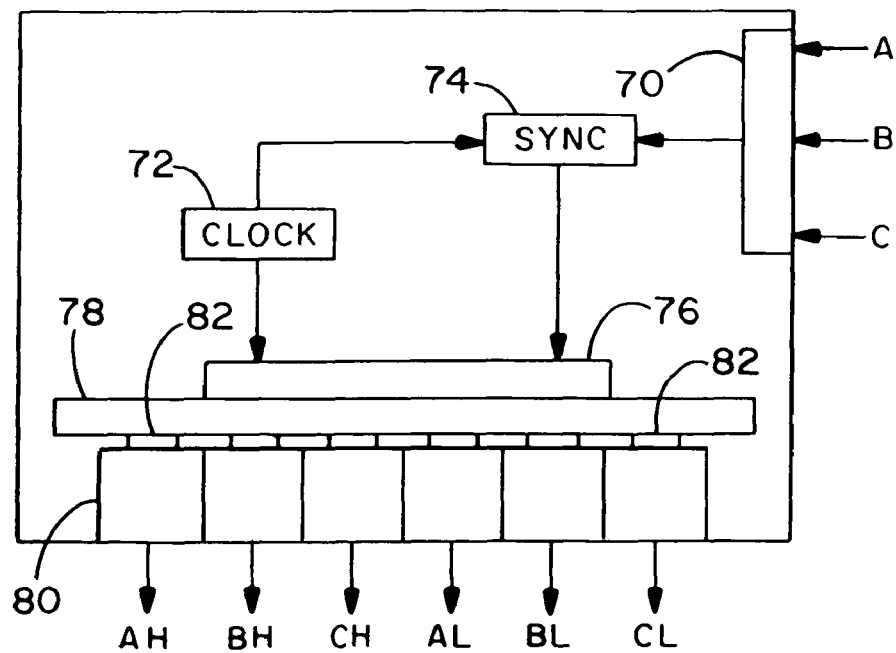
FIG. 8 is a more detailed diagrammatic view of the controller.

As seen in FIG. 8, controller 44 is a microprocessor configured to control driver 20 based on current rotor position information received from stator windings 38, 40 and 42. The controller includes a bank of data registers providing a storage area 70 for receiving inputs A, B and C from the stator windings. Each of inputs A-C is filtered or otherwise converted to a digital input. Controller 44 includes an internal clock 72. A synchronizing function 74, preferably a computer program, is coupled to clock 72 and storage area 70. A timing function 76 is coupled to receive inputs from internal clock 72 and synchronizing function 74. The timing function is operatively coupled to a commutation algorithm 78 stored in the controller. A storage area 80 includes six data registers, one corresponding to each of the driver control inputs AH, BH, CH, AL, BL, and CL. Finally, controller 44 includes six voltage control functions 82, one associated with each of the driver control inputs.

Storage area 70 receives inputs A-C in the form of back EMF signals, and accordingly samples each of the inputs only when the corresponding stator winding is not driven. More particularly, the synchronizing function is triggered by a zero crossing of the back EMF signal. Timing function 76 uses the inputs from the clock and synchronizing function, first to initiate the commutation cycle synchronous with the correct angular position of rotor 34, and then to repeatedly step the commutation algorithm through the commutation cycle in synchronization with rotor rotation, i.e. synchronized with motor speed. To this end, the timing function uses inputs A-C (current rotor angular position information) and the clock input to "look ahead" in the sense of projecting future rotor positions at which the commutation algorithm is to be stepped through the commutation cycle.

Figure 1:
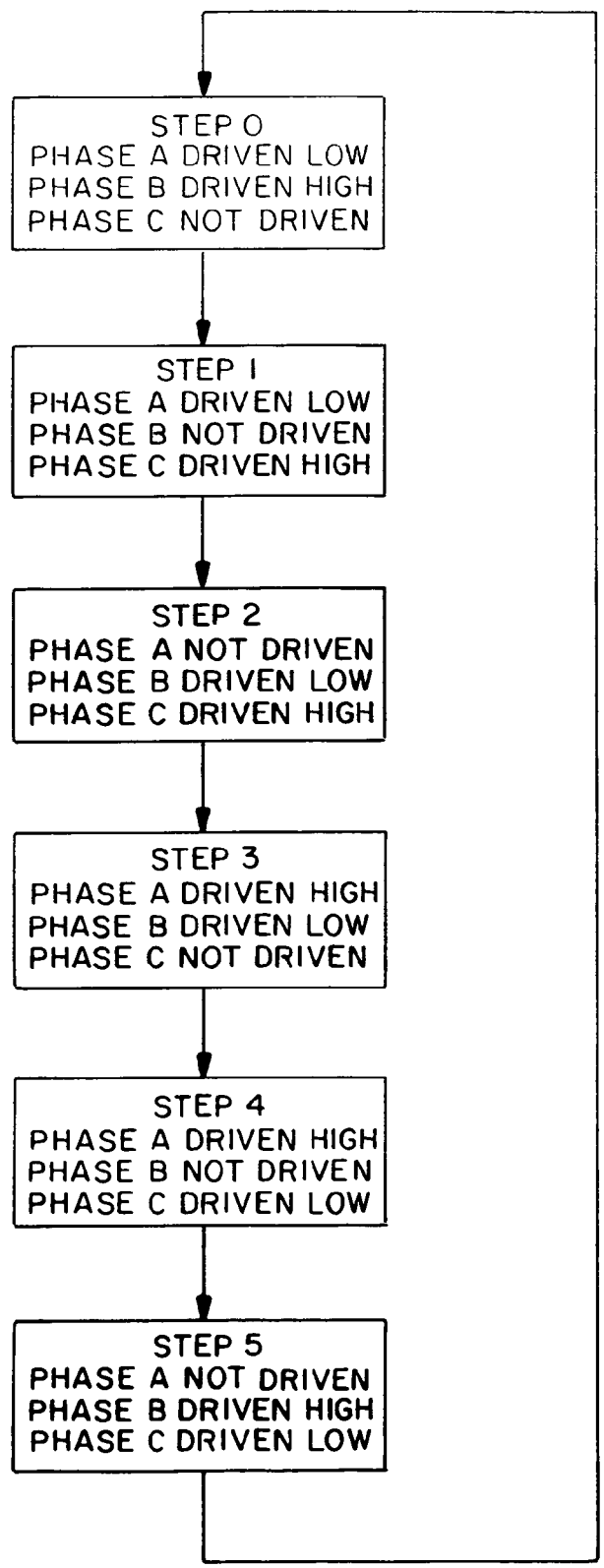
Figure 2A:
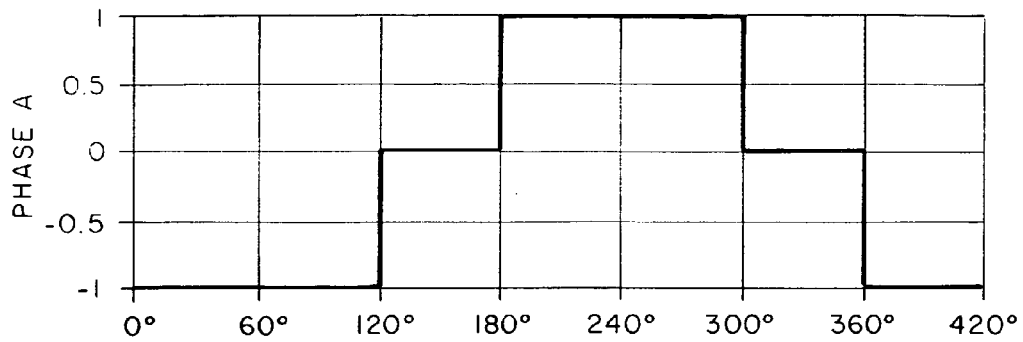
Figure 2B:
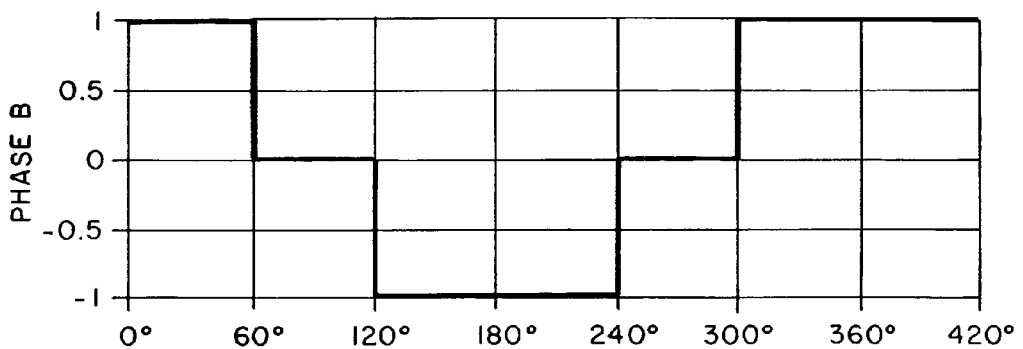
Figure 2C:
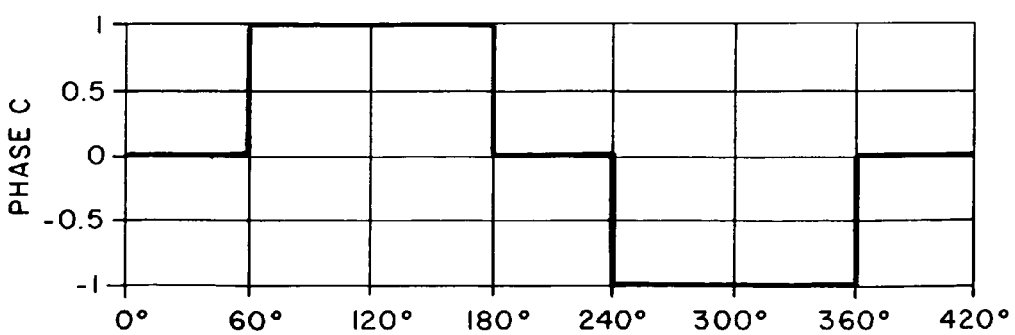
Figure 9:
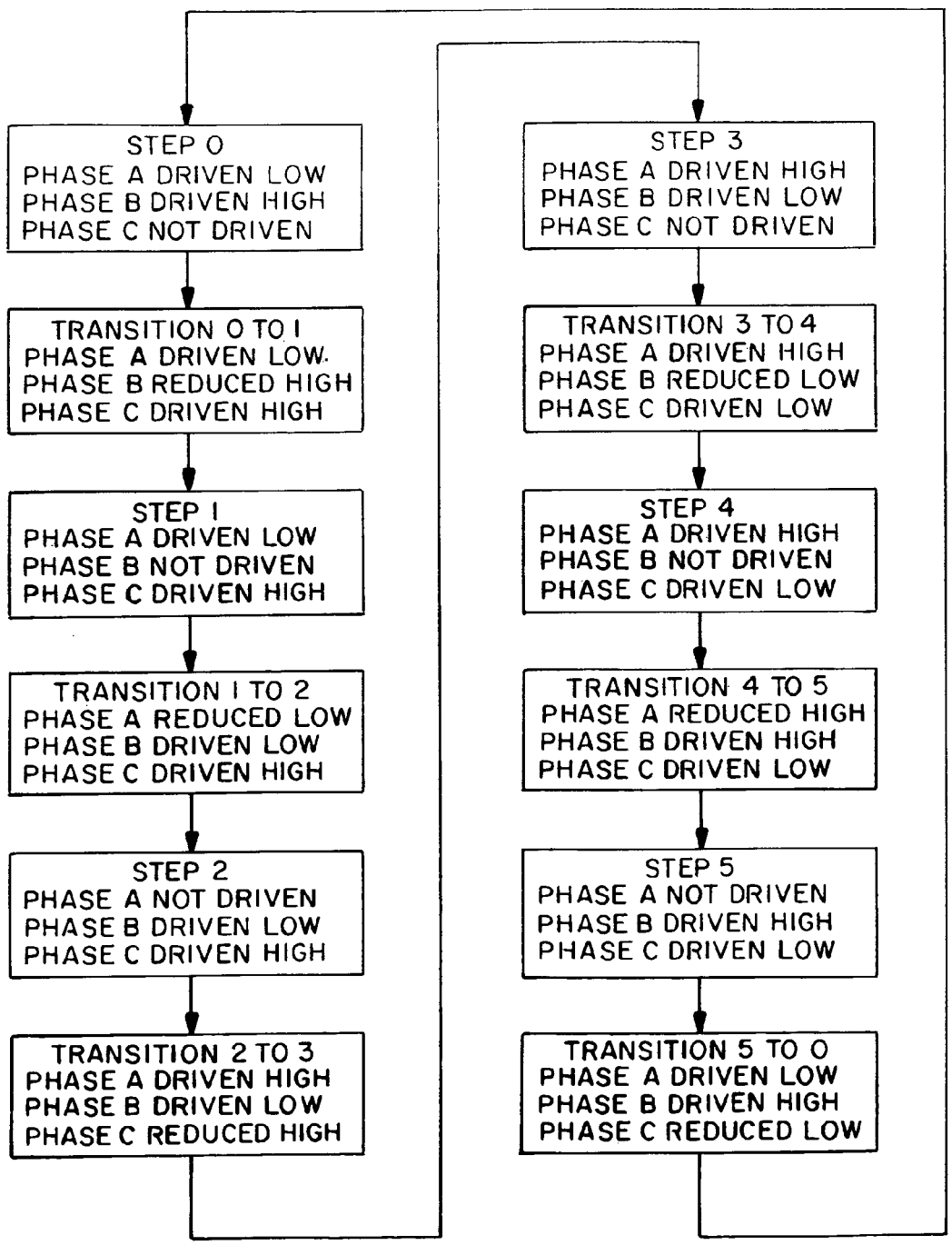
FIG. 9 is a flow chart depicting a commutation cycle modified in accordance with the present invention.

A feature of the present invention resides in configuring commutation algorithm 78 for smoother motor operation due to considerably reduced torque ripple. One aspect of this improvement is the addition of transitional steps to augment the traditional primary steps in the commutation cycle. As seen from FIG. 9 in comparison to FIG. 1, the commutation cycle implemented by algorithm 78 consists of twelve steps: an alternating sequence of six primary steps and six transitional steps.

FIGS. 10 A-C illustrate the commutation cycle with respect to each of stator windings 38, 40 and 42. As indicated by the alignment of the figures, the windings represent phases A-C angularly offset from another by 120 degrees, corresponding to 360 degrees of electrical rotation.

As is apparent from FIG. 10, the primary steps are much wider than the transition steps. Given the alternative arrangement of primary and transitional steps, pairs of steps including one transitional step and one primary step have an angular dimension of sixty degrees. In sensorless drives where back EMF provides position information, it is desirable to provide longer primary cycles and shorter transitional cycles. Of course, there is a minimum transitional step length necessary for achieving the torque smoothing function, which can vary with the motor design. Given these competing considerations, it has been found that transitional steps with angular dimensions of less than twenty degrees are preferred. More preferably, the transitional steps have angular dimensions of about ten degrees.

To provide the desired angular spacing, commutation algorithm 78 is stepped in alternating angular increments of 50 degrees for the primary steps and 10 degrees for the transitional steps. The transition points (or step initiation points) can be temporal locations as described above, or can be directly tied to instantaneous and projected positions of rotor 34. In either event, motor velocity is continually assessed to synchronize the commutation cycle with the motor.

As best seen from FIGS. 5 and 8, controller 44 steps driver 20 through the commutation cycle by simultaneously providing control inputs AH through CL individually to the gate terminals of switching elements 46-56. The commutation algorithm is shown in detail in FIG. 11, with each row corresponding to one of the control inputs, and each column corresponding to one of the discrete steps in the commutation cycle. Steps 0, 1 . . . 5 are the primary steps while steps 0/1 ... 5/1 are the transitional steps. Considering step "0," the AL input is a digital logic high or "1" at the gate of FET 48. With FET 46 off (input AH at 0), output terminal 28 is biased to the low voltage to drive stator winding 38 at the low voltage. Meanwhile, input BH also is set at 1, maintaining FET 50 on to bias output terminal 30 to the high voltage for driving stator winding 40 at the high voltage. Inputs CH and CL to the gates of FET's 54 and 56 are set to 0. With FET's 54 and 56 both switched off, output terminal 32 is not driven. Accordingly, during step 0, output terminal 28 is active in the sense of being biased to the low voltage, output terminal 30 is active in the sense of being biased to the high voltage, and output terminal 32 is inactive.

Primary steps 1-5 are similar. In each case, two of the switching elements are selectively switched on to bias two of the output terminals at the high voltage and low voltage respectively, while maintaining the third output terminal in the inactive state whereby its corresponding stator winding is not driven and its back EMF signal can be used to determine rotor position.

With further reference to FIG 11 regarding transitional step 0/1, driver control inputs CH and AL are set at logic level 1, while control input BH is indicated as "X." The remaining inputs AH, BL and CL are set at 0.

The actual BH input is the logic level 1 to the gate of FET 50. However, as compared to the settings designated "1," the "X" settings are effected in concert with actuating one of voltage control functions 82. Specifically, during transitional step 0/1, the voltage control function actuated is the one that corresponds to driver control input BH and FET 50. Control functions 82 are pulse width modulation functions. Thus, in much the same manner as the high voltage from power supply 18 can be pulse width modulated to control motor speed, the pulse width modulation functions individually coupled to the switching elements are applied selectively to reduce one of the voltage levels during each transitional step. As seen in FIG. 10, the result during transitional step 0/1 is that output terminal 30 associated with phase B is biased to an alternate voltage $V_A$ less than the high voltage, i.e. less than 1 according to the scale of the figure. Similarly during transitional step 3/4, input BL is designated "X" and operated in conjunction with the associated voltage control function. The resulting voltage at output terminal 30 is reduced in magnitude to an alternate voltage $V_A$ higher than negative one.

The cycles associated with phases A and C likewise include pairs of transitional cycles involving actuated voltage control functions. In each case, alternate voltage $V_A$ is between the nearest one of the high and low voltages and the center voltage represented as 0 in FIGS. 10 A-C. Preferably, each alternate voltage $V_A$ is closer to its associated voltage than it is to the center voltage, i.e. with a value above 0.5, or below negative 0.5. In one preferred arrangement, alternate voltages $V_A$ are about positive 0.75 and negative 0.75, again based on the scale of 1 to −1 in the figure. This provides a closer approximation to sinusoidal commutation for more effective reduction of torque ripple.

In terms of step starting points and angular increments, the commutation cycle is best seen in FIG. 10A-C. Primary step 0 starts at five degrees. Transitional step 0/1 starts at fifty five degrees and ends at sixty five degrees, the beginning of step 1. The alternating arrangement continues through the final transition step (5/0) which begins at three hundred and fifty five degrees. Thus, each transitional step is centered on the angular (or temporal) location of the abrupt change from one primary step to the next in traditional designs.

Figure 3A:
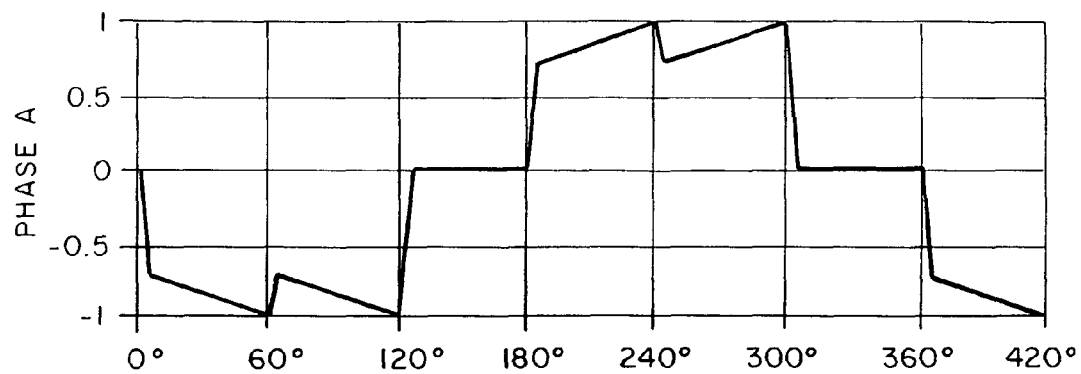
Figure 3B:
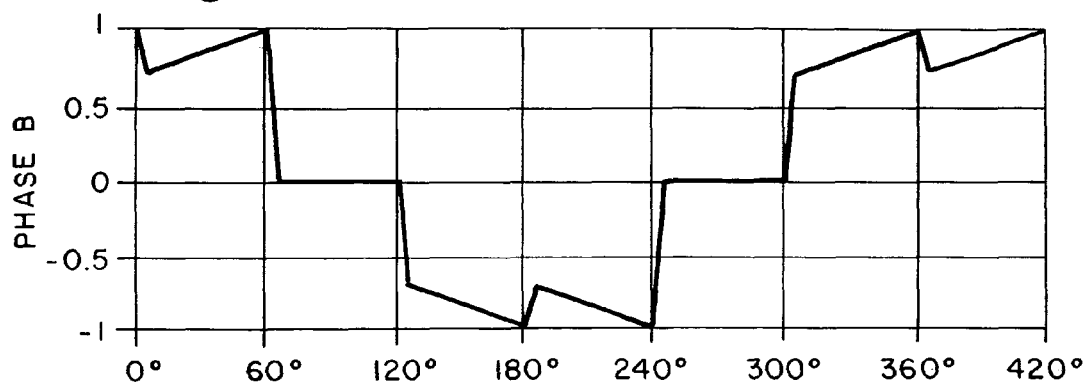
Figure 3C:
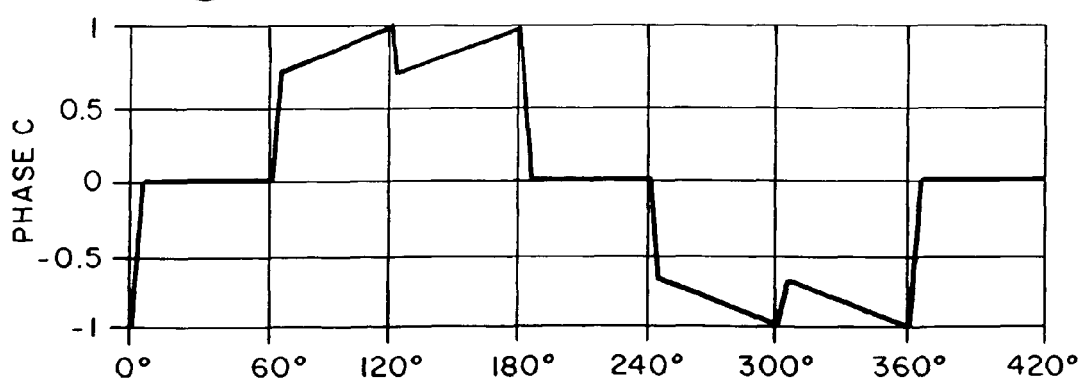
Figure 4:
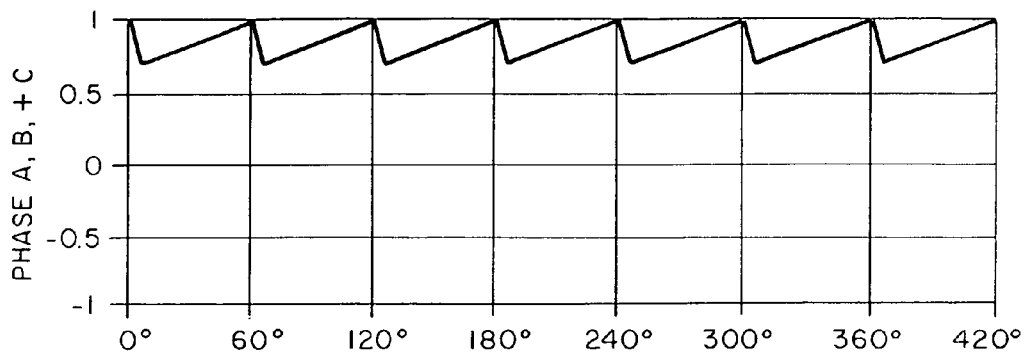

FIG. 12 illustrates the current in each of phases A-C resulting from the applied voltages in FIGS. 10 A-C. The smoother, trapezoidal waveforms compare favorably to the more abrupt waveforms in FIG. 3. As seen in FIG. 13, the resultant current is substantially uniform over the entire computation cycle, virtually eliminating current ripple.

FIG. 14 is a graphical illustration similar to FIG. 10B illustrating voltages at output terminal 30 throughout an alternative commutation cycle. In this cycle, an associated voltage control function 82 is actuated during four of the transitional steps: during transitions from one of the active states (1 or −1) to zero as in FIG. 10B, and also during transitions from zero to one of the active states; namely, transitional steps 1/2 and 4/5 in connection with phase B.

FIG. 15 graphically illustrates another alternative commutation algorithm in which two transitional steps are interposed between each succeeding pair of primary steps. Output terminal 28 is biased to a first alternate voltage $V_1$ during the first transitional step of the pair, then switched to a second alternate voltage $V_2$ that is reduced in magnitude (closer to zero) with respect to $V_1$.

Thus in accordance with the present invention, trapezoidally commutated motors are operated according to commutation cycles that virtually eliminate current ripple, permitting the use of brushless DC trapezoidally commutated motors in demanding applications formerly reserved for sinusoidally commutated motors.

What is claimed is:

1. A system for controlling a brushless DC motor, including:
    a commutation circuit having first and second input terminals for coupling the commutation circuit respectively to a high voltage terminal and a low voltage terminal of a DC power supply;
    the commutation circuit further having a plurality of output terminals adapted for coupling individually to a plurality of stator windings corresponding to different motor phases of a brushless DC motor to couple the commutation circuit to the DC motor;
    the commutation circuit further including a plurality of switching elements coupled between the input terminals and the output terminals, operable with respect to each output terminal to apply one of several alternative states including: (i) a first active state for biasing the output terminal to a high voltage to drive an associated stator winding at the high voltage; (ii) a second active state for biasing the output terminal at a low voltage to drive the associated stator winding at the low voltage; and (iii) an inactive state in which the associated stator winding is not driven;
    a plurality of voltage control functions individually associated with different ones of the output terminals, each control function being operable to bias its associated output terminal at an alternate voltage between the high voltage and the low voltage; and
    a controller operatively coupled to the commutation circuit to apply the alternative states selectively to the output terminals to generate a commutation cycle comprised of a sequence of primary steps, the controller further being operatively coupled to the voltage control functions to selectively actuate the control functions during transitional steps of the commutation cycle between pairs of adjacent primary steps, the controller being specifically operable with respect to a selected one of the output terminals undergoing a change in state between a given one of the primary steps and a succeeding one of the primary steps to bias the selected output terminal to the alternate voltage during a given transitional step between the given and succeeding primary steps.

2. The system of claim 1 wherein:
the controller further is configured for coupling to the DC motor to receive current rotor position information and to generate the commutation cycle synchronous with the rotor position information.

3. The system of claim 2 wherein:
the sequence of primary steps comprises primary steps during which at least one of the output terminals is in the inactive state, and the rotor position information comprises a back EMF signal from a stator winding associated with said at least one output terminal.

4. The system of claim 3 wherein:
at least one of the output terminals is in the inactive state during each of the primary steps, and the rotor position information comprises back EMF signals from each of the output terminals when in the inactive state.

5. The system of claim 2 wherein:
the controller is configured to use the rotor position information to determine a rotational velocity and to project locations for initiating the primary steps and the transitional steps.

6. The system of claim 5 wherein:
the controller further is configured to generate said locations as temporal locations.

7. The system of claim 1 wherein:
at least one of the output terminals transitions between the inactive state and one of the active states from each primary step to the next primary step, and the controller is configured to actuate the control function associated with said at least one of the output terminals during the transition step between said primary steps.

8. The system of claim 7 wherein:
the output terminals consist essentially of three output terminals corresponding to three different motor phases, at least two of the output terminals transition between the inactive state and one of the active states from each primary step to the next primary step, and the controller is configured to actuate only a selected one of the transitioning output terminals during the transition step.

9. The system of claim 8 wherein:
the commutation cycle is composed of an alternating sequence of six primary steps and six transitional steps corresponding to 360 degrees of electrical rotation.

10. The system of claim 9 wherein:
the transitional steps have an angular dimensions of less than twenty degrees.

11. The system of claim 10 wherein:
the transitional steps have angular dimensions of about ten degrees and the primary steps have angular dimensions of about fifty degrees.

12. The system of claim 1 wherein:
the alternate voltage applied during the given transitional step resides between the one of said high and low voltages applied during a selected one of the given primary step and the succeeding primary step, and a center voltage midway between the high voltage and the low voltage.

13. The system of claim 12 wherein:
the alternate voltage applied during the give transitional step is nearer to the one of said high and low voltages than to the center voltage.

14. The system of claim 1 wherein:
each of the switching elements comprises first and second field effect transistors coupled between the high voltage and the low voltage on opposite sides of the associated output terminal.

15. The system of claim 1 wherein:
each of the voltage control functions comprises a pulse width modulating component.

16. The system of claim 1 wherein:
the controller comprises a processor having a storage location for storing rotor position information, a clock operably associated with the storage location for generating a rotational velocity, a commutation algorithm for governing the switching elements and voltage control functions according to the commutation cycle, and a timing function operatively associated with the clock and the commutation algorithm for projecting temporal starting points of the primary steps and transitional steps.

17. A process for commutating an electric motor through a commutation circuit including switching elements coupled between a high voltage and a low voltage in pairs associated individually with different stator windings corresponding to different motor phases, the process including:
selectively operating the switching elements at discrete times synchronized with motor rotational speed to generate at each of the stator windings a commutation cycle composed of a series of primary steps, by alternatively applying one of several distinct states to each of the windings, wherein the alternative states include: (i) a first active state for biasing the output terminal to the high voltage to drive an associated stator winding at the high voltage; (ii) a second active state for biasing the output terminal at the low voltage to drive the associated stator winding at the low voltage; and (iii) an inactive state in which the associated stator winding is not driven;
operatively associating one of a plurality of voltage control functions with each of the stator windings;
selectively operating different ones of the voltage control functions at discrete times synchronized with said motor rotational speed to generate transitional steps between adjacent primary steps, whereby during each transition step, a voltage control function associated with a selected one of the stator windings transitioning between the inactive state and a selected one of the active states is actuated to bias the selected stator winding at an alternate voltage lower than the high voltage and higher than the low voltage.

18. The process of claim 17 wherein:
selectively operating the switching elements and the voltage control functions comprises using current rotor angular position information in conjunction with timing information to project future timing points for initiating the primary steps and the transitional steps.

19. The process of claim 18 wherein:
the series of primary steps comprises primary steps during which at least one of the stator windings is in the inactive state, and using the rotor angular position information comprises receiving a back EMF signal from the at least one stator winding.

20. The process of claim 19 wherein:
receiving the back EMF signal comprises receiving the back EMF signals from all of the stator windings, each in conjunction with a primary step during which the stator winding is in the inactive state.

21. The process of claim 17 wherein:
selectively operating the switching elements comprises generating the commutation cycle such that from each primary step to its succeeding primary step at least a selected one of the stator windings transitions between the inactive state and one of the active states, and selectively operating the voltage control functions comprises actuating the one of the voltage control functions associated with said selected stator winding during the transition step between said primary steps.

22. The process of claim 21 wherein:
the commutation cycle is further characterized in that at least two of the stator windings transition from each primary step to the succeeding primary step, wherein said selectively operating the voltage control functions comprises actuating only a voltage control function associated with a selected one of the at least two stator windings during the transition step.

23. The process of claim 17 wherein:
selectively operating the switching elements and voltage control functions comprises generating the commutation cycle as a sequence of alternating primary steps and transitional steps having respective uniform first and second angular dimensions, wherein the first angular dimension is at least three times the second angular dimension.

24. The process of claim 23 wherein:
the plurality of stator windings consists essentially of three stator windings corresponding to three different motor phases, and selectively operating the switching elements and the voltage control functions comprises generating said commutation cycle to include six primary steps and six transition steps wherein the first angular dimension is about fifty degrees and the second angular dimension is about ten degrees.

25. The process of claim 17 wherein:
selectively operating the voltage control functions comprises actuating a selected voltage control function associated with a selected stator winding transitioning between the inactive state and a selected one of the active states, and the alternate voltage resides between the voltage corresponding to the selected active state and a center voltage midway between the high voltage and the low voltage.

26. The process of claim 25 wherein:
the alternate voltage is closer to the voltage corresponding to the selected active state than to the center voltage.

27. The process of claim 17 wherein:
associating one of the voltage control functions with each of the stator windings comprises associating a different voltage control function with each of the switching elements.

* * * * *